United States Patent [19]

Matsuzawa et al.

[11] Patent Number: 5,138,508
[45] Date of Patent: Aug. 11, 1992

[54] MAGNETIC HEAD CORE

[75] Inventors: Soichiro Matsuzawa, Kuwana; Fuminori Takeya, Nagoya; Nobuhiro Terada, Kasugai, all of Japan

[73] Assignee: NGK Insulators, Ltd., Japan

[21] Appl. No.: 655,150

[22] Filed: Feb. 14, 1991

Related U.S. Application Data

[62] Division of Ser. No. 337,966, Apr. 12, 1989, Pat. No. 5,014,414.

[30] Foreign Application Priority Data

Apr. 12, 1988 [JP] Japan .................. 63-89340

[51] Int. Cl.$^5$ ................. G11B 5/265; G11B 5/29
[52] U.S. Cl. .................. 360/121; 360/125; 360/118; 29/603
[58] Field of Search ........... 360/121, 122, 125, 126, 360/118, 127

[56] References Cited

U.S. PATENT DOCUMENTS

| | | | |
|---|---|---|---|
| 3,514,851 | 6/1970 | Perkins et al. | 360/118 X |
| 4,188,247 | 2/1980 | Ridgeway et al. | 29/603 |
| 4,729,161 | 3/1988 | Verbunt et al. | 29/603 |
| 4,875,970 | 10/1989 | Takeya et al. | 29/603 X |

FOREIGN PATENT DOCUMENTS

| | | | |
|---|---|---|---|
| 56-16931 | 2/1981 | Japan | 360/121 |
| 57-4005 | 1/1982 | Japan . | |
| 56-220237 | 12/1983 | Japan | 360/121 |
| 59-124016 | 7/1984 | Japan | 360/121 |
| 59-227019 | 12/1984 | Japan . | |

Primary Examiner—John H. Wolff
Attorney, Agent, or Firm—Parkhurst, Wendel & Rossi

[57] ABSTRACT

A composite magnetic head core with a writing/reading track and two erasing tracks, including a first ferrite block, and a second and a third ferrite block bonded to opposite surfaces of the first block interposed therebetween. The opposite abutting surfaces of the first block have respective first and second recessed portions, and a first rectangular protrusion and two second rectangular protrusions which protrude from the first and second recessed portions, respectively. The first protrusion is positioned between the two second protrusions in a direction of width of the writing/reading and erasing tracks. The first protrusion cooperates with the second block, to define a writing/reading magnetic gap of the writing/reading track, while the second protrusions cooperate with the third block, to define two erasing magnetic gaps of the erasing tracks. The first protrusion has a width defining the width of the writing/reading track, and a longitudinal end defining a depth of the writing/reading magnetic gap. Similarly, each second protrusion has a width defining the width of the erasing tracks, and a longitudinal end defining a depth of the erasing magnetic gaps. The protrusions are formed by etching the opposite surfaces of the first block through appropriate etching masks.

9 Claims, 8 Drawing Sheets

MAGNETIC HEAD CORE

This is a division of application Ser. No. 07/337,966 filed Apr. 12, 1989.

BACKGROUND OF THE INVENTION

1. Field of the Invention

The present invention relates generally to a magnetic head core and a method for producing the same, and more particularly to a magnetic head core suitable for a video tape recorder (VTR) and a floppy disk drive (FDD), and a method for producing such VTR and FDD magnetic head cores.

2. Discussion of the Prior Art

In the art of information storage and retrieval by a floppy disk drive (FDD), there is a tendency toward high-density storage of information on a memory medium, for increasing the storage capacity of the memory medium. This tendency caused a bulk type magnetic head to become predominant in the art. A typical construction of such a bulk type magnetic head is disclosed in laid-open Publication No. 59-227019 of unexamined Japanese Patent Application. As shown in FIG. 1(b), this type of magnetic head has a writing/reading core 2 and an erasing core 4, which are bonded together with their backs butted together, such that magnetic gaps 2a, 4a of the cores 2, 4 maintain a predetermined relative position in the direction perpendicular to the direction in which the writing/reading and erasing tracks extend across the gaps 2a, 4a.

Described in detail, a pair of ferrite blocks are prepared for the writing/reading core 2, such that a groove is formed in each of the abutting surfaces of the two blocks, so as to define the width of the writing/reading track. The groove is filled with a glass material. The portion of the glass filler which are located outside the groove is removed, and the areas of the abutting surfaces at which the two ferrite blocks are bonded together are mirror-polished. Then, a groove for defining the depth of the writing/reading magnetic gap is formed in one of the ferrite blocks. Subsequently, the mirror polished areas of at least one of the abutting surfaces of the two blocks are coated with spacer layers having a suitable thickness, and the gap depth defining groove is filled with a glass material, so that the two ferrite blocks are bonded together by the glass. Thus, a ferrite core block for the writing/reading core 2 is prepared. The erasing core 4 is prepared in the same manner as the writing/reading core 2 described above.

The ferrite core blocks for giving the writing/reading and erasing cores 2, 4 are butted together at their backs, such that the writing/reading tracks and the erasing tracks are properly positioned relative to each other in the direction perpendicular to the direction of extension of the tracks. The core blocks are bonded together with a glass or resin, into an integral ferrite structure. Suitably shaped grooves are cut in the prepared ferrite structure, so as to provide leg portions. Subsequently, the ferrite structure is cut into two or more FDD composite magnetic head cores, each of which has the writing/reading core 2 and the erasing core 4, as shown in FIG. 1(b).

In the known method described above, two grooving operations for defining the width of the tracks are required for each of the core blocks for the writing/reading and erasing cores 2, 4. In addition, a further grooving operation is required for defining the depth of the magnetic gaps, for each of the core blocks. Also, bonding operations should be effected three times, i.e., the first bonding of the ferrite blocks to prepare the core block for the writing/reading core 2, the second bonding of the ferrite blocks to prepare the core block for the erasing core 4, and the third bonding of the two core blocks to prepare the integral core structure. Thus, the known method requires a comparatively large number of process steps, and the produced magnetic head core is relatively expensive.

Another drawback of the known composite magnetic head core is derived from the bonding of the two core blocks with the track defining grooves which have been formed independently of each other. Namely, the two core blocks should be positioned relative to each other when the core blocks are bonded together, with the writing/reading and erasing magnetic gaps separated from each other by the two inner abutting ferrite blocks. Accordingly, it is considerably difficult to establish sufficiently high accuracy of relative alignment of the writing/reading tracks and the erasing tracks.

Also known in the art is a magnetic head core having a single writing/reading core, as disclosed in laid-open Publication No. 57-4005 of examined Japanese Patent Application. According to the disclosure, the writing/reading track and the corresponding magnetic gap are formed by etching at least one of two ferrite blocks, through a pattern of etching masks applied to the ferrite block or blocks. However, this publication does not show a manner of producing a composite magnetic head core, by etching a ferrite block or blocks.

SUMMARY OF THE INVENTION

The present invention was developed in view of the above situation in the prior art. It is therefore a first object of the present invention to provide a method by which a magnetic head core can be economically and industrially suitably produced, with a considerably reduced number of process steps.

A second object of the invention is to provide a magnetic head core which has a construction suitable for economical production.

The first object may be accomplished according to one aspect of the present invention, which provides a method of producing a composite magnetic head core having a writing/reading track and two erasing tracks, comprising: preparing a first, a second and a third ferrite block, which are to be butted together to form an integral ferrite structure, such that the first ferrite block is interposed between the second and third ferrite blocks. The next step is applying a first and a second pattern of etching masks, respectively to opposite abutting surfaces of at least the first ferrite block, which are to be butted with respective abutting surfaces of the second and third ferrite blocks, the first and second patterns of etching masks including at least one first rectangular etching mask and at least two second rectangular etching masks, respectively. Then the opposite abutting surfaces of the first ferrite block are etched through the first and second patterns of etching masks, thereby forming at least one rectangular first protrusion corresponding to the at least one first rectangular etching mask on one of the opposite abutting surfaces, and at least two second rectangular protrusions corresponding to the at least two rectangular second etching masks on the other abutting surface, each of the at least one first protrusion having a width defining a width of the writing/reading track, and a longitudinal end defining a depth of a writing/reading magnetic gap associated with the writing/reading track, each of the at least two protrusions having a width defining a width of the two erasing tracks, and a longitudinal end defining a depth of two erasing magnetic gaps associated with the two erasing tracks, respectively. The first, second and third ferrite blocks are then butted and bonded together such, that the first ferrite block is bonded to the second and third ferrite blocks at its opposite abutting surfaces.

In the method of the present invention described above, the first and second rectangular protrusions are concurrently formed on the opposite abutting surfaces of the first ferrite block, by etching operations through the respective first and second rectangular etching masks. Namely, the etching of one of the opposite abutting surfaces of the first ferrite block results in the at least one first rectangular protrusion which defines not only the width of the writing/reading track but also the depth of the writing/reading magnetic gap. Similarly, the etching of the other abutting surface of the first ferrite block results in the at least two second rectangular protrusions which define not only the widths of the two erasing tracks but also the depths of the two erasing magnetic gaps. Thus, the instant method requires a relatively reduced number of process steps, as compared with the known method which requires many grooving operations to define the widths of the writing/reading and erasing tracks and the depths of the corresponding magnetic gaps. Thus, the present method permits the production of the composite head core at a relatively reduced cost. Further, the first and second rectangular protrusions may be easily and consistently formed to the desired dimensions, by a suitable etching technique combined with a photolithographic masking technique. That is, the consistently or uniformly shaped and dimensioned first and second protrusions formed on the etched first ferrite block assure consistent operating characteristics of the composite magnetic head cores produced according to the instant method in a large lot size.

Further, the etching operations of the opposite abutting surfaces of the first ferrite block may be performed simultaneously, if desired.

Moreover, since the first and second protrusions are formed by means of the corresponding first and second rectangular etching masks applied to the opposite abutting surfaces of the first ferrite block, the relative position between the writing/reading track and the erasing tracks is not influenced by the positions of the second and third ferrite blocks relative to the first ferrite block. In other words, the writing/reading and erasing tracks are not positioned relative to each other when the three ferrite blocks are bonded together, but the alignment of these tracks is established by the first and second patterns of etching masks, more specifically, by the relative position between the first and second rectangular etching masks corresponding to the first and second rectangular protrusions. Accordingly, the writing/reading track and the erasing tracks may be easily and accurately aligned or positioned relative to each other.

The composite magnetic head core produced according to the present method is used such that the two erasing tracks are positioned on the trailing side of the core while the writing/reading track is positioned on the leading side, so that the opposite edge portions of a recording track on a magnetic disk are erased after information is written, in order to prevent reading of remnant noise signals when the information to be read is written over previously stored information on that recording track.

The first ferrite block may be subject to further etching operations through respective etching mask patterns, such that the first and second rectangular protrusions are exposed. With these etching operations, the first and second rectangular protrusions are etched to a first and a second depth, respectively, with respect to the masked portions of the opposite abutting surfaces of the first block. The first depth corresponds to an amount of the writing/reading magnetic gap in a direction of extension of the writing/reading track, while the second depth corresponds to an amount of the erasing magnetic track in the direction of extension.

A ferrite structure consisting of the bonded first, second and third blocks may be cut into two ferrite bars, along a cutting plane which is perpendicular to the opposite abutting surfaces of the first ferrite block and which is parallel to a direction of width of the protrusions. In this case, each first protrusion and each second protrusion have opposite longitudinal ends each of which define the depth of the writing/reading and erasing magnetic gaps of the composite magnetic head cores obtained from the two ferrite bars. The cutting plane divides a length of the first and second protrusions into two halves which have the above-indicated opposite longitudinal ends, respectively.

The first and second rectangular etching masks are formed on the opposite abutting surfaces of the first ferrite block such that each first protrusion is positioned between adjacent two of the second protrusions in a direction of the widths of the protrusions. A ferrite structure consisting of the bonded first, second and third ferrite blocks, is cut into a plurality of composite magnetic head cores, along cutting planes perpendicular to the abutting surfaces of the first ferrite block and parallel to a direction of extension of the writing/reading and erasing tracks, such that each composite magnetic head core is provided with the writing/reading track extending across the writing/reading magnetic gap, and the two erasing tracks extending across the two erasing magnetic gaps, respectively.

The first ferrite block is preferably formed of a single crystal of ferrite, such that the opposite abutting surfaces are provided by crystal planes of the single crystal selected from the group including: (100); (110); (211); (311); (332) and (611).

The second and third ferrite blocks may be subjected to etching operations through respective patterns of etching masks similar to the first and second patterns of etching masks, so as to form third and fourth rectangular protrusions identical with the first and second protrusions, respectively, so that the first and third protrusions cooperate to define the width and depth of the writing/reading track, while the second and fourth protrusions cooperate to define the width and depth of the two erasing tracks.

The second object may be achieved according to another aspect of the present invention, which provides a composite magnetic head core having a writing/reading track and two erasing tracks, comprising a first ferrite block having opposite abutting surfaces, and a second and a third ferrite block which are bonded to the opposite abutting surfaces of the first ferrite block. At least the opposite abutting surfaces have a first and a second recessed portion formed therein, respectively, and a first rectangular protrusion and two second rectangular protrusions which protrude from the first and second recessed portions, respectively. The first protrusion is positioned between the two second protrusions in a direction of width of the writing/reading and erasing tracks. The first rectangular protrusion cooperates with an abutting surface of the second ferrite block, to define a writing/reading magnetic gap across which the writing/reading track extends, and the second rectangular protrusions cooperate with an abutting surface of the third ferrite block, to define two erasing magnetic gaps, respectively. The two erasing tracks extend across the two erasing magnetic gaps, respectively. The first rectangular protrusion has a width defining the width of the writing/reading track, and a longitudinal end defining a depth of the writing/reading magnetic gap. Each of the two second rectangular protrusions has a width defining the width of the two erasing tracks, and a longitudinal end defining a depth of the two erasing magnetic gaps.

In one form of the composite magnetic head core of the present invention, the first rectangular protrusion has a pair of first opposite chamfers formed along opposite lateral edges thereof so as to define the width of the writing/reading track, and a second chamfer formed along a lower edge thereof remote from the writing/reading track, so as to define a lower end of the writing/reading magnetic gap, while each of the second rectangular protrusions has a pair of third opposite chamfers formed along opposite lateral edges thereof so as to define the width of the two erasing tracks, and a fourth chamfer formed along a lower edge thereof remote from the corresponding erasing track, so as to define a lower end of the corresponding erasing magnetic gap.

The second and third ferrite blocks may have a third and a fourth recessed portion formed in the abutting surfaces thereof, respectively. In this case, the second ferrite block has a rectangular third protrusion protruding from the third recessed portion, so as to cooperate with the first protrusion to define an amount of the writing/reading magnetic gap in a direction of extension of the writing/reading track, and the third ferrite block has two rectangular fourth protrusions protruding from the fourth recessed portion, so as to cooperate with the second protrusions to define an amount of the two erasing magnetic gaps in the direction of extension.

The first ferrite block is preferably formed of a single crystal of ferrite, such that the opposite abutting surfaces are provided by crystal planes of the single crystal selected from the group including : (100); (110); (211); (311); (332) and (611).

The second object may also be achieved according to a further aspect of the invention, which provides a magnetic head core, comprising: a first ferrite block having an abutting surface, and a second ferrite block having an abutting surface and bonded to the first ferrite block such that the abutting surfaces of the first and second ferrite blocks are butted together. The abutting surface of the first ferrite block has a first recessed portion formed therein, and a first rectangular protrusion which protrudes from the first recessed portion. The first rectangular protrusion has a width defining a width of a track. The abutting surface of the second ferrite block has a second recessed portion formed therein, and a second rectangular protrusion which protrudes from the second recessed portion and which cooperates with the first protrusion to define a magnetic gap across which the track extends. The first and second rectangular protrusions have lower ends which define a depth of the magnetic gap. At least one of the first and second ferrite blocks is formed of a single crystal of ferrite, such that the abutting surface of the above-indicated at least one ferrite block is provided by a crystal plane of the single crystal selected from the group including: (100); (110); (211); (311): (332); and (611).

The crystal planes indicated above assure accurate dimensioning of the first and second rectangular protrusions, i.e., accurate dimensioning of the width and depth of the track and the magnetic gap.

Preferably, each of the first and second ferrite blocks is formed of a single crystal of ferrite such that the abutting surfaces of the first and second ferrite blocks are provided by the crystal planes indicated above.

The first and second rectangular protrusions may be formed by etching through respective patterns of etching masks, as described above with respect to the composite magnetic head core.

The first rectangular protrusion may have a pair of first opposite chamfers formed along opposite lateral edges thereof so as to define the width of the track, and a second chamfer formed along a lower edge thereof remote from the track, so as to define a lower end of the magnetic gap.

BRIEF DESCRIPTION OF THE DRAWINGS

The foregoing and other objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1A:
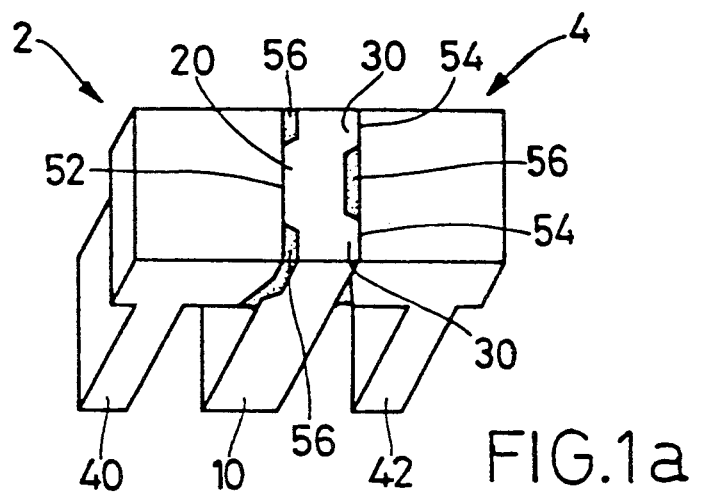
FIG. 1(a) is a perspective view of one embodiment of a composite magnetic head core of the present invention.
Figure 1B:
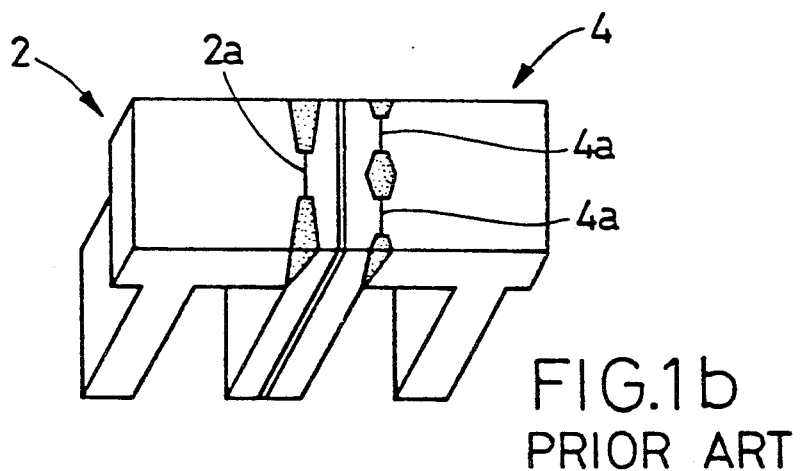
FIG. 1(b) is a perspective view of an example of a known composite magnetic head core.

To produce a magnetic head core, two or three blocks of ferrite are prepared. For example, a first, a second and a third ferrite block are prepared to produce a composite magnetic head core for a floppy disk drive. The ferrite blocks have a generally elongate rectangular shape having a suitable thickness or height, made of a known ferrite material having a relatively high degree of magnetic permeability. These ferrite blocks are butted and bonded together, as described below, so as to form a closed magnetic path defined in a magnetic head, i.e., a generally annular magnetic path.

Preferably, the highly permeable ferrite blocks consist of single crystals or polycrystal structures of Mn-Zn ferrite or Ni-Zn ferrite, or a composite structure consisting of a single crystal ferrite portion and a polycrystal ferrite portion. Particularly, the first ferrite block which is etched according to the principle of the present invention preferably consists of a single crystal of ferrite, for improving the dimensional accuracy of writing/-reading and/or erasing tracks, namely, the accuracy of width of the tracks. In this case, it is desirable that the crystal planes indicated above be used as an abutting surface or surfaces of the first ferrite block at which the first ferrite block is butted with the other ferrite block or blocks, so as to define a magnetic gap or gaps.

One of the two ferrite blocks, or at least the first ferrite block of the first, second and third ferrite blocks is etched through a suitable pattern of rectangular etching masks formed so as to cover selected portions of the abutting surface or surfaces. As a result of the etching, protrusions or raised portions are formed on the abutting surface or surfaces of the relevant ferrite block or blocks, such that the opposite long-side or lateral edges of each protrusion which define its width are chamfered so as to determine the width of the track, while the opposite short-side edges defining the length of the protrusion are chamfered so as to determine the depth of the magnetic gap. In other words, each rectangular etching mask has a width corresponding to the track width, and the opposite longitudinal ends of the mask determine the depth of the magnetic gap.

Described more specifically with respect to the manufacture of a composite magnetic head core for a floppy disk drive, at least the first ferrite block which is positioned between the second and third ferrite blocks is etched as shown in FIGS. 2(a) through 2(e), before the three ferrite blocks are butted and bonded together so as to form an integral ferrite structure. Initially, a plurality of elongate rectangular etching masks 14 are formed in a predetermined pattern on a transversely intermediate portion of a mirror-polished abutting surface 12 of the first ferrite block indicated at 10. Further, two comparatively long strip-like second etching masks 16 are formed so as to cover the transversely opposite end portions (width portions) of the abutting surface 12. These end portions of the first ferrite block 10 are eventually held in abutting contact with the second and third ferrite blocks, in the prepared ferrite structure (shown in FIG. 6). In the instant specific example, the prepared ferrite structure is cut into two halves, one of which is indicated at 50 in FIG. 7. That is, two ferrite bars 50 are obtained from the first, second and third ferrite blocks. (from the ferrite structure of FIG. 6). To this end, the array of the parallel spaced-apart rectangular first etching masks corresponding to the magnetic gap portion is positioned in the transversely intermediate or middle portion of the abutting surface 12 of the first ferrite block 10.

Figure 2A:
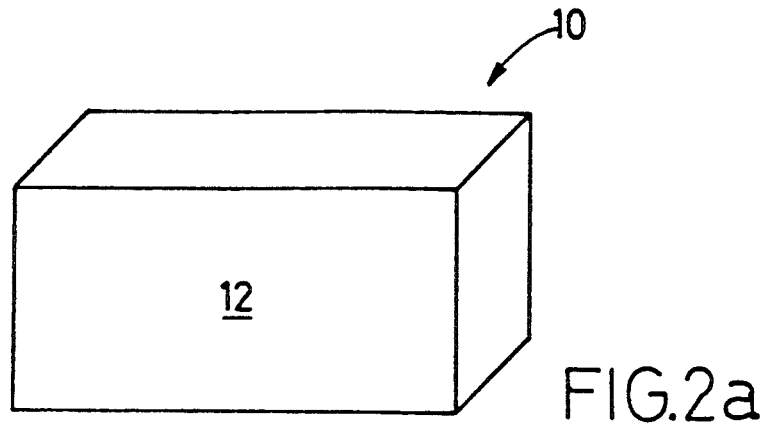
FIG. 2(a) is a perspective view showing a first ferrite block used in one example of a method for producing the magnetic head core of FIG. 1(a) according to the invention.
Figure 2B:
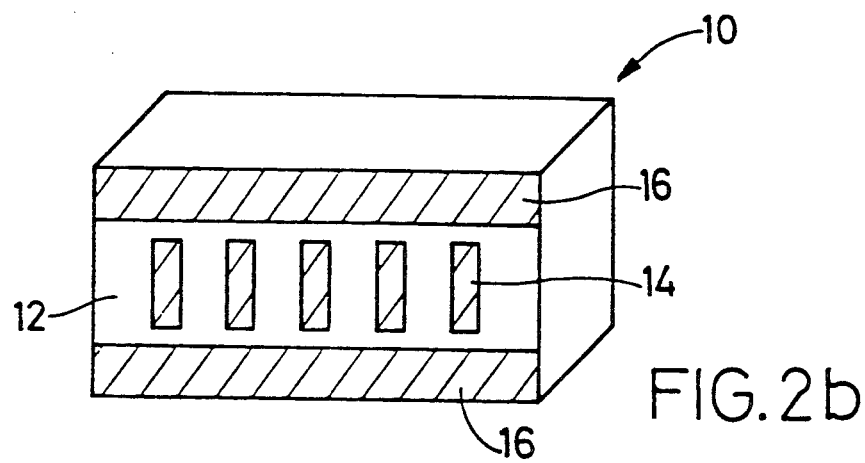
FIGS. 2(b) and 2(c) are perspective views respectively showing the first ferrite block on which etching masks are formed, and the same block which has been etched.
Figure 2C:
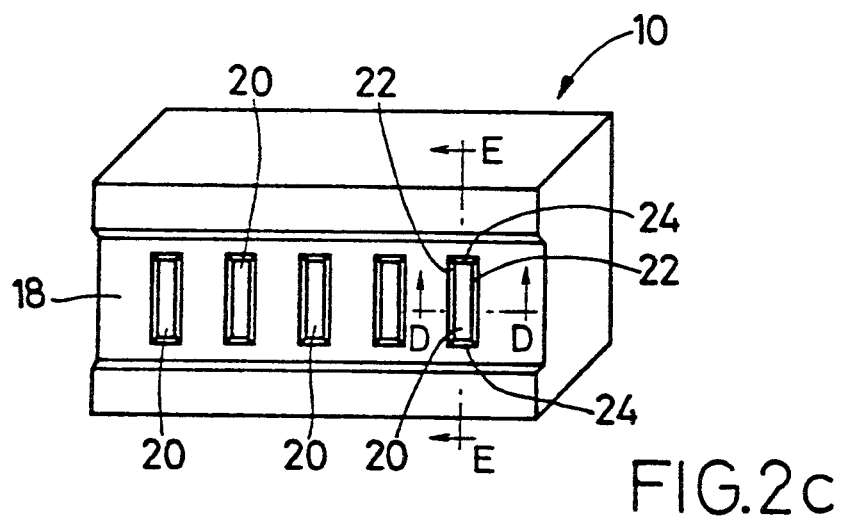

As indicated above, the width of each elongate rectangular etching mask 14 in the longitudinal direction of the ferrite block 10 or horizontal direction of FIG. 2(b) is determined so as to define the width of the writing/-reading track of the prepared composite magnetic head core, while the positions of the longitudinal opposite edges of the mask 14 in the vertical direction of FIG. 2(b) are determined so as to define the depth of the magnetic gap across which the track extends.

The rectangular and strip-like etching masks 14, 16 are formed by a suitable known technique such as screen printing, which is selected to meet the required accuracy and economy of production. In particular, a photoetching method using a photoresist is preferably practiced for relatively easy formation of the masking pattern. For instance, a layer of a photoresist is initially applied to the entire area of the abutting surface 12 of the ferrite block 10, and then exposed to a radiation through a suitably formed photomask, so that the photoresist is left in the selected local rectangular portions (14) and in the transversely opposite end portions (16) of the abutting surface 12. The etching masks 14, 16 may be formed of a positive or a negative type photoresist, or formed of a suitable material such as Cr, or SiO or SiO$_2$, by vacuum vapor deposition, sputtering, chemical vapor deposition (CVD) or other technique. The method of forming the masks 14, 16 and the material of the masks are suitably selected from various standpoints, such as the adhesiveness of the masks to the abutting surface 12.

The first ferrite block 10 with the etching masks 14, 16 applied thereto is etched to a suitable depth. As a result, a recessed section or patterned recess 18 corresponding to the non-masked part is formed in the transversely intermediate portion of the abutting surface 12. Consequently, a pattern of rectangular protrusions or raised sections 20 is formed so as to protrude from the bottom of the patterned recess 18.

Figure 2D:
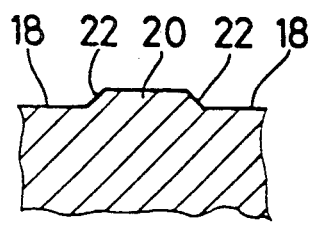
FIGS. 2(d) and 2(e) are fragmentary explanatory views in cross section taken along lines D—D and E—E of FIG. 2(c), respectively.
Figure 2E:
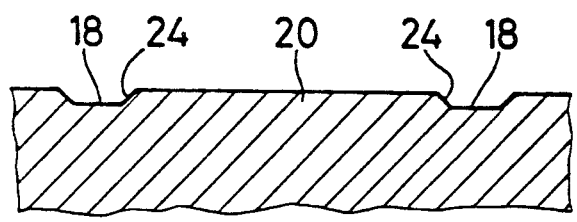

The rectangular protrusions 20 correspond to the first etching masks 14, and each of these protrusions 20 has a pair of first chamfers 22 along the opposite lateral or long-side edges, and a pair of second chamfers 24 along the opposite short-side edges, as illustrated in FIGS. 2(d) and 2(e). The first chamfers 22 define the width of the writing/reading track, while the second chamfers 24 define the depth of the magnetic gap. It will be understood that the transversely opposite end portions of the abutting surface 12 which are covered by the strip-like etching masks 16 are also left unetched as relatively long rectangular raised sections.

The etching operation is effected according to an ordinary electrolytic or chemical etching method, preferably using an aqueous solution consisting of water and the balance principally consisting of phosphoric acid, as disclosed in laid-open Publication No. 62-83483 of unexamined Japanese Patent Application. During the etching of the abutting surface 12 of the first ferrite block 10, the opposite abutting surface 28 (FIG. 4) is entirely covered or masked for protection against the etching solution.

Figure 3A:
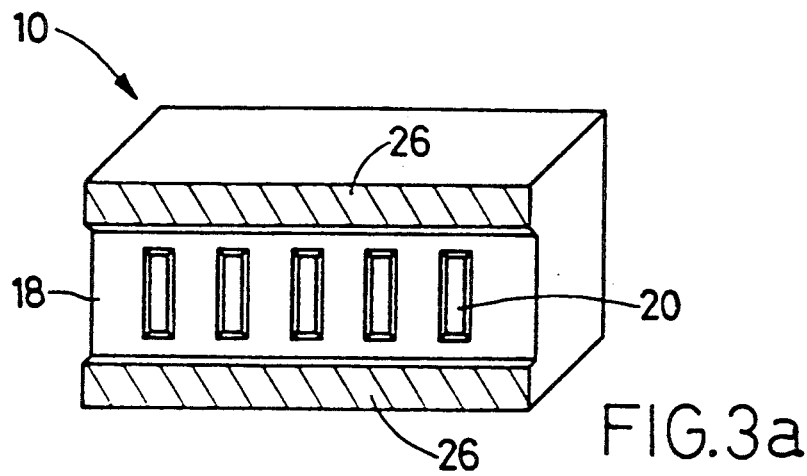
FIGS. 3(a) and 3(b) are perspective views, respectively, showing the etched first ferrite block on which further etching masks are formed, and the same block which has been subjected to a second etching process through those etching masks.
Figure 6:
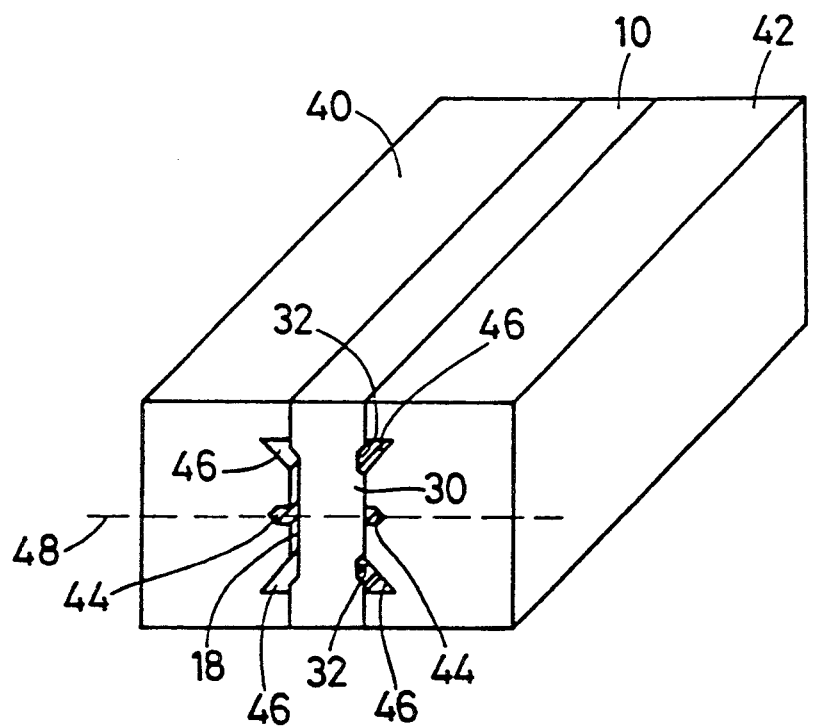
FIG. 6 is a perspective view of a ferrite assembly consisting of the first ferrite block, and the second and third ferrite blocks bonded t the opposite etched surfaces of the first block.

The thus etching abutting surface 12 of the first ferrite block 10 with the recessed and raised sections 18, 20 is further etched, in order to give a certain amount of the magnetic gap formed in the eventually prepared head core. Described in detail by reference to FIG. 3(a), strip-like etching masks 26 similar to the second etching mask 16 are applied to the transversely opposite end portions of the abutting surface 12 which were covered by the etching masks 16. Etching masks (not shown) may also be applied to cover only a longitudinally central portion of each protrusion 20, such that the masks extend in the longitudinal direction of the block 10. The central portions of the protrusions 20 define a cutting plane 48 along which the integral ferrite structure of FIG. 6 is cut into the two ferrite bars 50, as described later. The cutting plane 48 is perpendicular to the abutting surfaces 12, 28 of the first ferrite block 10 and is parallel to the direction of width of the protrusions 20, 30. The cutting plane 48 divides the length of each protrusion 20, 30 into two halves. Then, the abutting surface 12 is etched so that the non-covered portions of the protrusions 20 and the recess 18 are etched to a suitable depth which corresponds to the amount of the magnetic gap obtained.

Figure 3B:
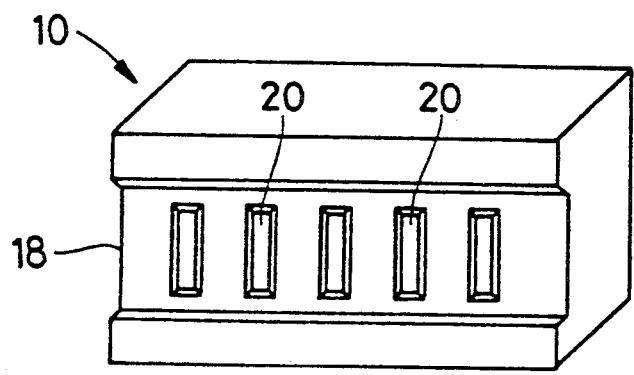

As a result of the second etching of the abutting surface 12, the depth of the recess 18 is increased, while the height of the protrusions 20 with respect to the non-etched portions is decreased by an amount corresponding to the desired amount of the magnetic gap, as indicated in FIG. 3(b). Thus, the etching steps for the writing/reading track and magnetic gap of the composite magnetic head core are completed.

The first ferrite block 10 whose abutting surface 12 has been subjected to the etching steps for the writing/reading track is then etched on the other abutting surface 28 opposite to the already etched abutting surface 12, in the same manner as described above. This surface 28 provides erasing tracks and magnetic gaps of the composite magnetic head core.

Figure 4:
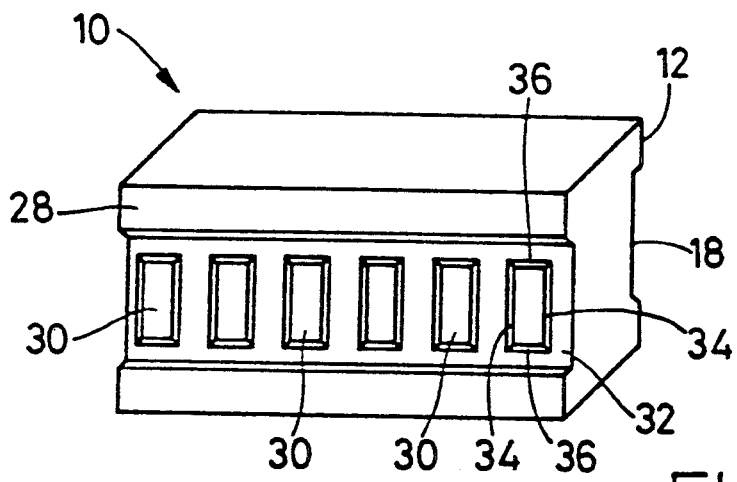
FIG. 4 is a perspective view showing the first ferrite block of FIG. 3(b) which is further etched on a surface opposite to the already etched surface.

Described more particularly referring to FIG. 4, an array of rectangular protrusions 30 corresponding to applied rectangular masks are formed in the transversely intermediate portion of the abutting surface 28 for the erasing tracks and magnetic gaps, such that the protrusions 30 protrude from the surface of a patterned recess 32. Like the protrusions 20, the protrusions 30 have a pair of first chamfers 34 formed along the lateral or long-side edges so as to define the width of the erasing tracks, and a pair of second chamfers 36 formed along the short-side edges so as to define the depth of the magnetic gaps. The etching masks for the protrusions 30 are formed so that each protrusion 30 is positioned between the adjacent two protrusions 20, as viewed in the longitudinal direction of the ferrite block 10.

In the method according to the present embodiment, the masking and the etching are effected separately or at different times on the two abutting surfaces 12, 28 of the ferrite block 10. However, the masking and etching operations for defining the width of the tracks and the depth of the magnetic gaps may be simultaneously performed on the two abutting surfaces 12, 28. Further, the masking and etching operations for defining the amount of the magnetic gaps may also be performed simultaneously on the two abutting surfaces 12, 28.

Figure 5:
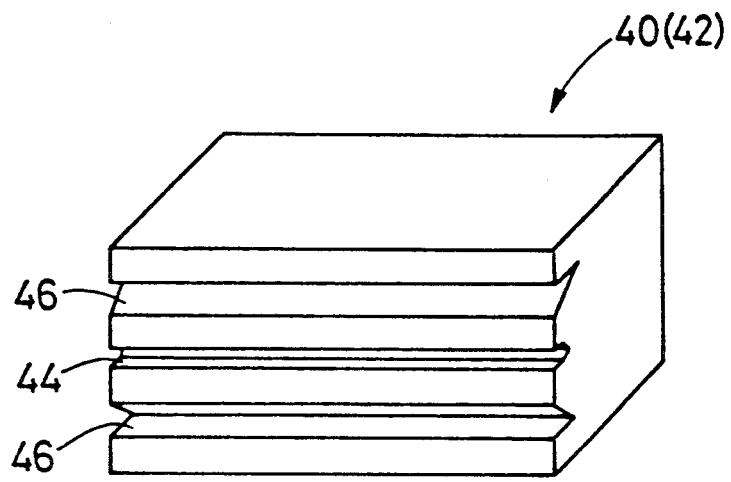
FIG. 5 is a perspective view of a second or third ferrite block which has grooves in a surface thereof.

In the meantime, an abutting surface of each of the second and third ferrite blocks 40, 42 which abuts on the abutting surface 12 or 28 of the first ferrite block 10 is mirror-polished. One of the second and third ferrite blocks 40, 42 is shown in FIG. 5. As illustrated in the figure, a center groove 44 and two outer grooves 46 are formed in the abutting surface. The center groove 44 is provided to permit air to escape when the second and third ferrite blocks 40, 42 are glass-bonded to the first ferrite block 10. The outer grooves 46 are provided to accommodate rods of a glass filler, which are melted so as to flow into the magnetic gaps, and voids between the tracks, which gaps and voids ar formed between the first and second blocks 10, 40, and between the first and third blocks 10, 42. The glass fillers in the grooves 46 also serve to reinforce the bonding strength of the blocks 10, 40, 42. The depth of the magnetic gaps to be formed is determined by the second chamfers 24, 36 of the protrusions 20, 30, as described above, but is not determined by the positions of the outer grooves 46.

The thus prepared first, second and third ferrite blocks 10, 40, 42 are butted together such that the second and third ferrite blocks 40, 42 are disposed on the opposite sides of the first block 10, in abutting contact with the abutting surfaces 12, 28, as shown in FIG. 6. In this condition, two magnetic paths are formed on the ferrite structure of FIG. 6. Namely, a first magnetic path is formed by the first and second ferrite blocks 10, 40, while a second magnetic path is formed by the first and third ferrite blocks 10, 42. Further, the writing/reading magnetic gaps are defined by and between the top surfaces of the protrusions 20 on the abutting surface 12 of the first block 10, and the corresponding portions of the surface of the second block 40 in which the grooves 44, 46 are formed. The erasing magnetic gaps are defined by and between the top surfaces of the protrusions 30 on the abutting surface 28 of the first block 10, and the corresponding portions of the surface of the third block. These three ferrite blocks 10, 40, 42 are bonded together by a known direct solid-solid reaction bonding technique, at a sintering temperature of the ferrite.

Figure 7:
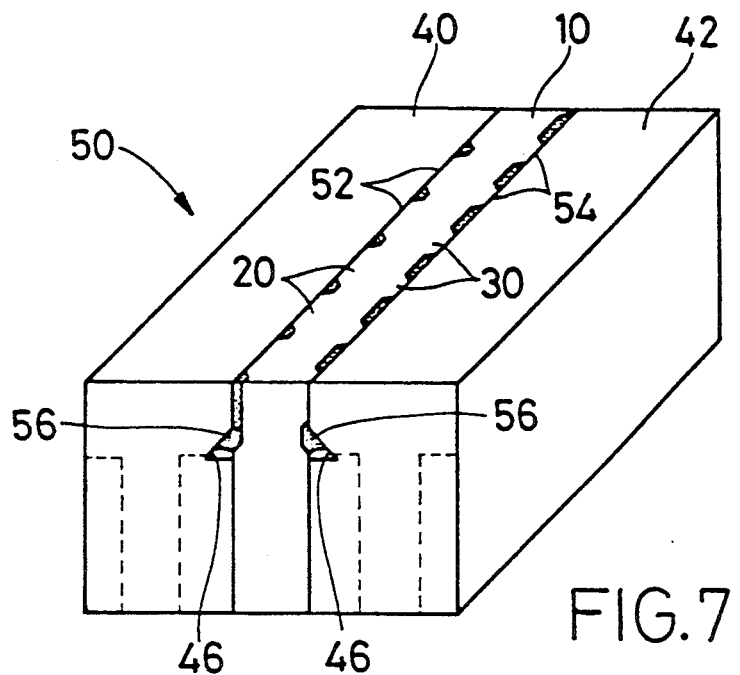
FIG. 7 is a perspective view showing one of two ferrite bars obtained from the ferrite assembly of FIG. 6.

The magnetic gaps, voids between the tracks, and grooves 46 which are formed in the ferrite structure of FIG. 6 consisting of the integrally bonded three ferrite blocks 10, 40, 42 are filled with a suitable non-magnetic material such as a glass, so that the glass fillers serve to increase the bonding force of the three ferrite blocks which have been bonded together by the solid-solid reaction. The thus prepared integral ferrite structure of FIG. 6 is cut along the cutting line 48 aligned with the center groove 44, as indicated in the figure. As a result, the upper and lower halves of the ferrite structure are separated from each other, as the two ferrite bars 50, 50, one of which is illustrated in FIG. 7. In this figure, reference numeral 52 denotes the writing/reading magnetic gaps defined between the first and second ferrite blocks 10, 40, while reference numeral 54 denotes the erasing magnetic gaps defined between the first and third ferrite blocks 10, 42. Further, reference numeral 56 denotes the glass fillers.

Figure 8:
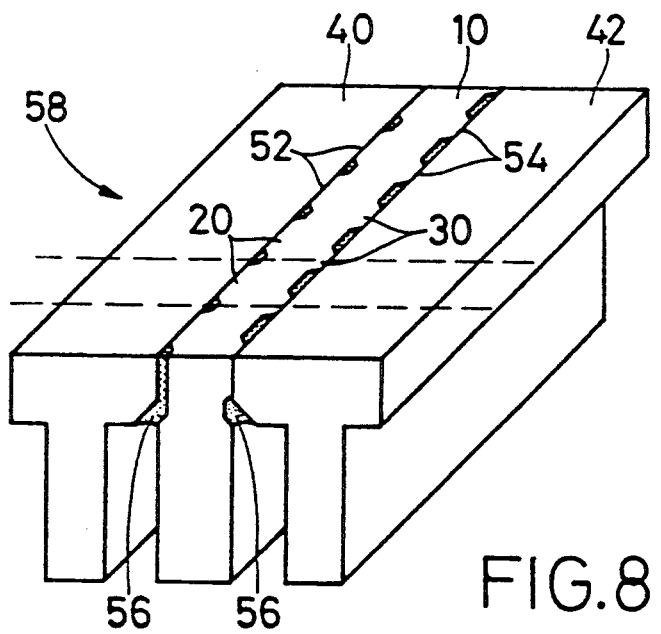
FIG. 8 is a perspective view of a grooved core block prepared by cutting grooves in the ferrite bar of FIG. 7.

Each of the two ferrite bars 50, 50 is subjected to a grooving operation on the writing/reading core portion (second ferrite block portion 40) and the erasing core portion (third ferrite block portion 42), as indicated in broken lines in FIG. 7, so that a grooved ferrite bar 58 having longitudinal grooves as shown in FIG. 8 is obtained. One or more FDD composite magnetic head cores are prepared from this grooved ferrite bar 58, by cutting the bar 58 along cutting planes indicated in FIG. 8, which are perpendicular to the abutting surfaces 12, 28 and parallel to the direction of extension of the writing/reading and erasing tracks.

Figure 9A:
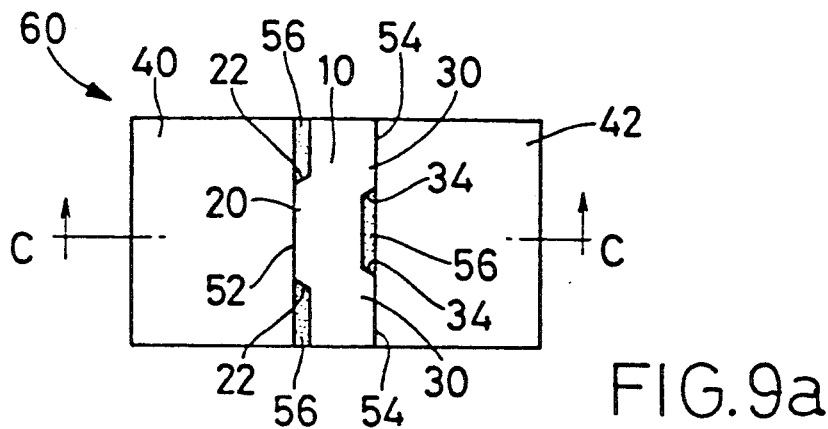
FIGS. 9(a) and 9(b) are plan and side elevational views of the composite magnetic head core of FIG. 1(a) prepared according to the method of the invention illustrated in the preceding figures.
Figure 9B:
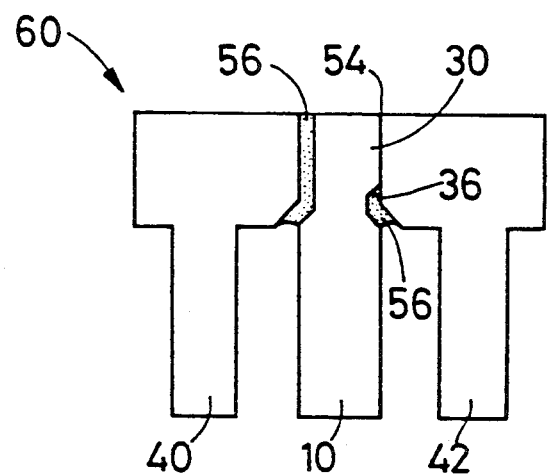
Figure 9C:
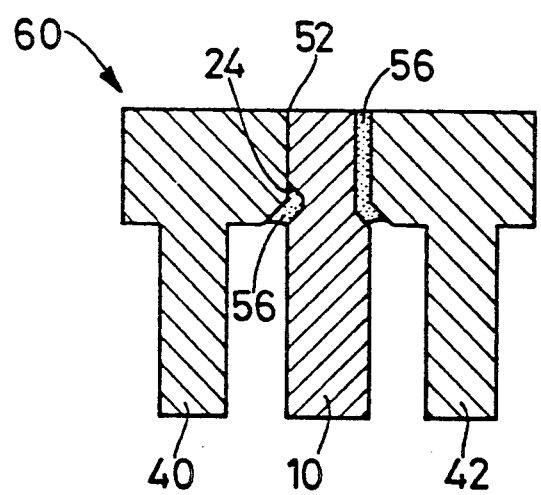
FIG. 9(c) is a cross sectional view taken along line C—C of FIG. 9(a)

One of the composite magnetic head cores prepared as described above is shown in the perspective view of FIG. 1(a), and is generally indicated at 60 in the plan and elevational views of FIGS. 9(a) and 9(b), and in the cross sectional view of FIG. 9(c) taken along line C—C of FIG. (a). As is apparent from these figures, the protrusions 20 formed on the appropriate sections of the abutting surface 12 of the first ferrite block 10 define the width of the writing/reading track and the depth of the writing/reading magnetic gap 52, while the protrusions 30 formed on the abutting surface 28 define the width of the erasing tracks and the depth of the erasing magnetic gaps 54.

More specifically, the long-side chamfered edges 22, 22, 34, 34 of the rectangular protrusions 20, 30 define the widths of the writing/reading and erasing tracks, and the short-side chamfered edges 24, 24, 36, 36 of the protrusions 20, 30 define the depth or bottom end of the magnetic gaps.

Figure 10:
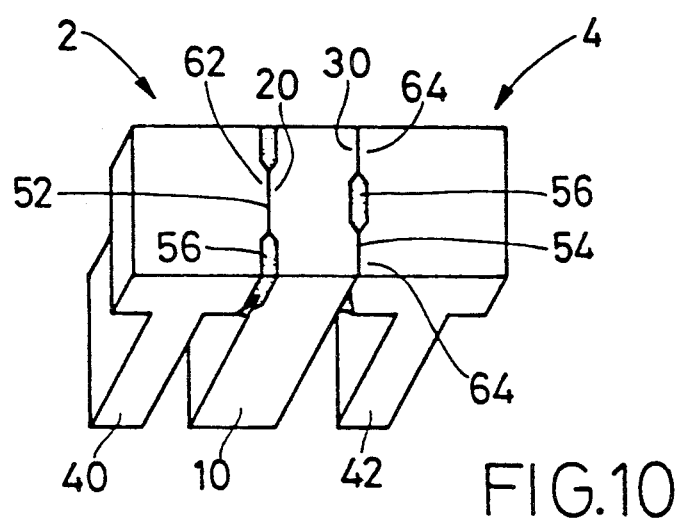
FIGS. 10 and 11 are perspective views illustrating other embodiments of the present invention.

In the illustrated embodiment of the composite magnetic head core 60, the protrusions 20, 30 for defining the width of the tracks and the depth of the magnetic gaps are formed only on the abutting surfaces 12, 28 of the first ferrite block 10. However, similar protrusions may be formed also on the abutting surfaces of the second and third ferrite blocks 40, 42, as indicated at 62, 64 in FIG. 10. In the case where the protrusions 20, 62, and 30, 64 are formed on both of the abutting surfaces of the adjacent two ferrite blocks 10, 40, and 10 and 42, to define the magnetic gaps 52, 54, the depth of the magnetic gaps 52, 54 may be determined by one of the two protrusions 20 and 62, and one of the two protrusions 30, 64.

In the composite magnetic head cores shown in FIGS. 9(a)-9(c) and FIG. 10, the first ferrite block 10 is commonly used for constituting the writing/reading head core and the erasing head core. However, two first ferrite blocks may be used with the second and third ferrite blocks 40, 42, so that the two ferrite blocks are used for each of the writing/reading and erasing head cores. In this case, a single writing/reading, and a single erasing head core may be prepared, if the two first ferrite blocks are not bonded together.

While the present invention has been described in detail in its presently preferred embodiments in the form of a single or composite magnetic head core for a floppy disk drive (FDD), it is to be understood that the invention is not limited to the details of the illustrated embodiments, but may be embodied with various changes, modifications and improvements, which may occur to those skilled in the art, without departing from the spirit and scope of the invention defined in the appended claims.

For example, the principle of the present invention is applicable to the production of magnetic head cores other than those for FDD, such as head cores for VTR (video tape recorders), DAT (Digital audio tape recorders) and RDD (rigid magnetic disk drives). An example of a VTR magnetic head core produced according to the invention is illustrated in FIG. 11, in which reference numerals 66 and 68 designate ferrite blocks, and reference numerals 70, 72 designate protrusions formed on these ferrite blocks 66, 68 so as to define a single magnetic gap.

Figure 11:
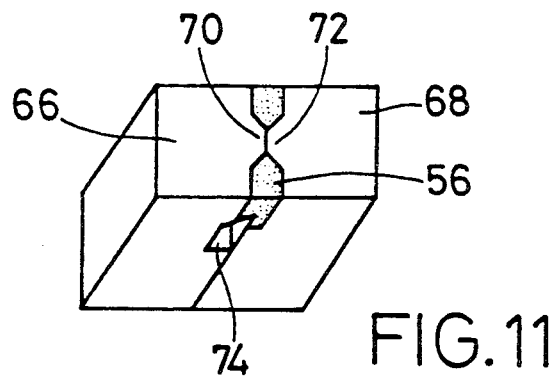

In the embodiment of FIG. 11, it is preferable that each of the ferrite blocks 66, 68 is formed of a single crystal of ferrite and that the abutting surfaces of the blocks 66, 68 are provided by crystal planes of the ferrite single crystals selected from the group including: (100); (110); (211); (311); (332) and (611).

In the illustrated embodiments, the amount of the magnetic gaps is provided by etching the top surfaces of the protrusions 20, 30 to a desired depth before the ferrite blocks ar bonded together to form the magnetic gaps filled with a glass. However, it will be understood that the amount of the magnetic gaps may be provided by forming spacer layers having a desired thickness on the abutting surfaces of the ferrite blocks, before the ferrite blocks are bonded together at the spacer layers.

What is claimed is:

1. A composite magnetic head core having a writing/reading track and two erasing tracks, comprising:
   a first ferrite block having opposite abutting surfaces;
   a second and a third ferrite blocks which are bonded together to said first ferrite block, at said opposite a butting surfaces;
   at least said opposite abutting surfaces having a first and a second recessed portion formed therein respectively, and a first rectangular protrusion and two second rectangular protrusions which protrude from said first and second recessed portions, respectively, said first protrusion being positioned between said two second protrusions in a direction of widths of said writing/reading and erasing tracks;
   said first rectangular protrusion cooperating with an abutting surface of said second ferrite block, to define a writing/reading magnetic gap across which said writing/reading track extends, said second rectangular protrusions cooperating with an abutting surface of said third ferrite block, to define two erasing magnetic gaps, respectively, said two erasing tracks extending across said two erasing magnetic gaps, respectively;
   said first rectangular protrusion having a width defining said width of said writing/reading track, and a longitudinal end defining a depth of said writing/reading magnetic gap; and
   each of said two second rectangular protrusions having a width defining said width of said two erasing tracks, and a longitudinal end defining a depth of said two erasing magnetic gaps.

2. A composite magnetic head core according to claim 1, wherein said first rectangular protrusion has a pair of first opposite chamfers formed along opposite lateral edges thereof so as to define said width of said writing/reading track, and a second chamfer formed along a lower edge thereof remote from said writing/reading track, so as to define a lower end of said writing/reading magnetic gap, each of said second rectangular protrusions having a pair of third opposite chamfers formed along opposite lateral edges thereof so as to define said width of said two erasing tracks, and a fourth chamfer formed along a lower edge thereof remote from the corresponding erasing track, so as to define a lower end of the corresponding erasing magnetic gap.

3. A composite magnetic head core according to claim 1, wherein said second and third ferrite blocks have a third and a fourth recessed portion formed in said abutting surfaces thereof, respectively, said second ferrite block having a third rectangular protrusion protruding from said third recessed portion, so as to cooperate with said first protrusion to define an amount of said writing/reading magnetic gap in a direction of extension of said writing/reading track, said third ferrite block having two fourth rectangular protrusions protruding from said fourth recessed portion, so as to cooperate with said second protrusions to define an amount of said two erasing magnetic gaps in said direction of extension.

4. A composite magnetic head core according to claim 1, wherein said first ferrite block is formed of a single crystal of ferrite, said opposite abutting surfaces being provided by crystal planes of said single crystal selected from the group including (100); (110); (211); (311); (332) and (611).

5. The composite magnetic head core of claim 1, wherein said first rectangular protrusion directly contacts said abutting surface of said second ferrite block, and said second rectangular protrusions directly contact said abutting surface of said third ferrite block.

6. A magnetic head core, comprising:
a first ferrite block having an abutting surface;
a second ferrite block having an abutting surface and bonded to said first ferrite block such that the abutting surfaces of said first and second ferrite blocks are butted together;
said abutting surface of said first ferrite block having a first recessed portion formed therein, and a first rectangular protrusion which protrudes from said first recessed portion;

said first rectangular protrusion having a width defining a width of a track;
said abutting surface of said second ferrite block having a second recessed portion formed therein, and a second rectangular protrusion which protrudes from said second recessed portion and which cooperates with said first protrusion to define a magnetic gap across which said track extends;
said first and second rectangular protrusions having lower ends which define a depth of said magnetic gap; and
at least one of said first and second ferrite blocks being formed of a single crystal of ferrite, said abutting surface of said at least one ferrite block being provided by a crystal plane of said single crystal selected from the group including: (100); (110); (211); (311): (332); and (611).

7. A magnetic head core according to claim 6, wherein each of said first and second ferrite blocks is formed of said single crystal of ferrite.

8. A magnetic head core according to claim 6, wherein said first and second rectangular protrusions are formed by etching through respective patterns of etching masks.

9. A magnetic head core according to claim 6, wherein said first rectangular protrusion has a pair of first opposite chamfers formed along opposite lateral edges thereof so as to define said width of said track, and a second chamfer formed along a lower edge thereof remote from said track, so as to define a lower end of said magnetic gap.

* * * * *